US008085447B2

(12) United States Patent
Ono

(10) Patent No.: US 8,085,447 B2
(45) Date of Patent: Dec. 27, 2011

(54) IMAGE READING APPARATUS AND IMAGE READING METHOD

(75) Inventor: Takashi Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 954 days.

(21) Appl. No.: 12/049,448

(22) Filed: Mar. 17, 2008

(65) Prior Publication Data

US 2008/0231877 A1 Sep. 25, 2008

(30) Foreign Application Priority Data

Mar. 19, 2007 (JP) ................................. 2007-071198

(51) Int. Cl.
H04N 1/04 (2006.01)

(52) U.S. Cl. ........ 358/474; 358/475; 358/509; 358/498; 382/254; 315/312

(58) Field of Classification Search .................. 358/475, 358/474, 497, 496, 498, 1.9, 406, 509, 505, 358/520, 501, 515, 516, 518; 382/254, 275, 382/274; 315/312
See application file for complete search history.

(56) References Cited

U.S. PATENT DOCUMENTS

| 4,930,008 | A  | * | 5/1990  | Suzuki et al. ................ | 358/500  |
|-----------|----|---|---------|--------------------------------|----------|
| 5,537,229 | A  | * | 7/1996  | Brandestini et al. .......... | 358/509  |
| 6,104,510 | A  | * | 8/2000  | Hu et al. ....................... | 358/509  |
| 6,665,434 | B1 | * | 12/2003 | Yamaguchi ................... | 382/162  |
| 6,989,917 | B2 | * | 1/2006  | Honbo ........................... | 358/475  |
| 7,023,589 | B2 | * | 4/2006  | Yamaguchi ................... | 358/487  |
| 7,173,234 | B2 | * | 2/2007  | Hiromatsu ..................... | 250/226  |
| 7,224,483 | B2 | * | 5/2007  | Hanabusa et al. .............. | 358/1.6  |
| 7,342,687 | B2 | * | 3/2008  | Kubo ............................. | 358/3.01 |
| 7,548,341 | B2 | * | 6/2009  | Gotoh et al. ................... | 358/1.9  |
| 7,566,856 | B2 | * | 7/2009  | Kubo et al. .................... | 250/208.1|
| 7,570,388 | B2 | * | 8/2009  | Yokoyama et al. ............ | 358/1.7  |
| 7,586,642 | B2 | * | 9/2009  | Chiba ............................. | 358/1.9  |
| 7,639,404 | B2 | * | 12/2009 | Ikeno et al. .................... | 358/461  |
| 7,777,914 | B2 | * | 8/2010  | Seko et al. ..................... | 358/1.9  |
| 2002/0071135 | A1 | * | 6/2002 | Takeda et al. ................. | 358/1.14 |
| 2002/0131094 | A1 | * | 9/2002 | Koshimizu et al. ........... | 358/509  |
| 2004/0051918 | A1 | * | 3/2004 | Sato et al. ...................... | 358/509  |
| 2005/0012948 | A1 | * | 1/2005 | Gotoh et al. ................... | 358/1.9  |
| 2005/0018226 | A1 | * | 1/2005 | Chiba ............................. | 358/1.9  |
| 2006/0114521 | A1 | * | 6/2006 | Bailey et al. ................... | 358/474  |
| 2007/0085924 | A1 | * | 4/2007 | Oshima et al. ................. | 348/312  |
| 2007/0291334 | A1 | * | 12/2007| Nakanishi ...................... | 358/509  |
| 2008/0231917 | A1 | * | 9/2008 | Tsukahara ...................... | 358/475  |

FOREIGN PATENT DOCUMENTS

| JP | 6-152869   | 5/1994 |
| JP | 07-143286 A | 6/1995 |
| JP | 9-11547    | 1/1997 |
| JP | 9-116694   | 5/1997 |

(Continued)

*Primary Examiner* — Negussie Worku

(74) *Attorney, Agent, or Firm* — Fitzpatrick, Cella, Harper & Scinto

(57) ABSTRACT

This invention solves the problem of color misalignment upon reading a color image. An image reading apparatus according to this invention reads an image by scanning a scanning unit which mounts a reading sensor which reads light beams which are emitted by three light sources, which emit light beams of three primary colors, and reflected by an original document. The image reading apparatus conveys the original document by ⅓ of the reading width of the reading sensor in the conveyance direction of the original document every time the image is read. The image is read by switching between the three light sources so that each pixel of the image is read with the light beams from them.

9 Claims, 11 Drawing Sheets

FOREIGN PATENT DOCUMENTS

| | | |
|---|---|---|
| JP | 9-289566 | 11/1997 |
| JP | 11-298670 | 10/1999 |
| JP | 11-331504 A | 11/1999 |
| JP | 2000-332960 | 11/2000 |

\* cited by examiner

MOVING DIRECTION OF CARRIAGE

F I G. 10
CONVEYANCE
DIRECTION OF
ORIGINAL DOCUMENT

IMAGE READING APPARATUS AND IMAGE READING METHOD

BACKGROUND OF THE INVENTION

1. Field of the Invention

The present invention relates to an image reading apparatus and image reading method which read a color image by moving a reading sensor using a raster scan scheme and light source switching scheme.

2. Description of the Related Art

Conventionally, an image reading apparatus irradiates an original document with light from a light source, accumulates the light reflected by the original document in a photoelectric transducer, and converts the accumulated charge amount into pixel data, thereby reading the original document. A color image reading apparatus of a light source switching scheme sequentially switches between light sources of red (R), green (G), and blue (B) and reads an image, thereby acquiring pixel data of respective color components. In addition, an image reading apparatus of a raster scan scheme generally reads an original document for each line using a reading sensor with a reading width equal to or longer than the width of the original document. An image reading apparatus of a sheet feed scheme generally reads an original document for each line while conveying the original document. An image reading apparatus of a flat bed type generally reads an original document for each line while scanning a reading sensor. There has also been known a method of moving a reading sensor, with a reading width shorter than the width of an original document, in a direction perpendicular to the conveyance direction of the original document and alternately repeating the reading and conveyance of the original document for each reading width of the reading sensor, thereby reading the original document (see Japanese Patent Laid-open No. 11-331504).

There has been proposed a method of alternately repeating the conveyance of an original document (or reading sensor) and the reading of R, G, and B color components for each line (see Japanese Patent Laid-open No. 7-143286).

However, an image reading apparatus of a flat bed type executes the so-called moving-document reading which alternately repeats the movement of an original document (or reading sensor) and the switching between light sources for each raster to read the original document. For example, as shown in FIG. 10, first, an original document (or reading sensor) is moved after irradiating it with light from an R light source and reading one line. Next, the original document (or reading sensor) is moved after irradiating it with light from a G light source and reading one line. Lastly, the original document (or reading sensor) is moved after irradiating it with light from a B light source and reading one line. A total of three lines are thus read to obtain color image data corresponding to one line in a direction perpendicular to the conveyance direction of the original document and one pixel in the conveyance direction of the original document. Referring to FIG. 10, a halftone portion indicates image data corresponding to one pixel. Since the original document (or reading sensor) always moves during the reading of three lines, the reading position of the original document changes for each color in practice, as shown in FIG. 10. In other words, different portions are irradiated with light beams from the R, G, and B light sources and read. This makes it impossible to acquire accurate color data and therefore causes color misalignment, leading to deterioration in the read image.

To solve the problem of this color misalignment, the above-described Japanese Patent Laid-open No. 7-143286 proposes a method of switching between R, G, and B light sources for each line and then moving an original document (or reading sensor) instead of the so-called moving-document reading. In other words, this patent reference proposes a method of conveying an original document (or reading sensor) by one line and then reading R, G, and B color components, and alternately repeating the conveyance and reading. Even though this method eliminates color misalignment in units of pixel, a delay and vibration attributed to a conveying mechanism have adverse influences on the operation because the conveyance of the original document (or reading sensor) and the reading of the original document are alternately repeated for each line. This may decrease the position accuracy, resulting in deterioration in the read image. As a matter of course, when a sufficiently long time is taken until the conveying mechanism stabilizes, any delay and vibration attributed to the conveying mechanism have no adverse influences on the operation. However, since a standby time is necessary for each reading of one line, the reading time may prolong. Also, since a mechanism which prevents any delay and vibration of the conveying mechanism must be newly provided, the entire conveying mechanism may become complicated and the cost may rise.

Japanese Patent Laid-open No. 11-331504 describes a method of reading an image with a band width of 128 pixels for each color. In a certain band region, an R component is read and data (R1) of 48 pixels on the lower side of data of 128 pixels are accumulated in a memory. A G component is read and data (G1) of 48 pixels on the lower side are similarly accumulated in the memory. A B component is read in the same way. Next, in a band region adjacent to the certain band region, an R component is read and data (R2) of 48 pixels on the upper side of data of 128 pixels are accumulated in the memory. A G component is read and data (G2) of 48 pixels on the upper side are similarly accumulated in the memory. A B component is read in the same way. An averaging process is performed for the R components using the data R1 and R2 accumulated in the memory. Likewise, the averaging process is performed for the G and B components using the data G1 and G2 and B1 and B2, respectively. However, this patent reference merely proposes averaging pixel data having undergone overlapping reading, in order to reduce band nonuniformity for each reading band due to the gap between an original document and a reading sensor. This patent reference has an arrangement different from that according to the present invention, and neither refers to nor solves the color misalignment to be solved by the present invention.

SUMMARY OF THE INVENTION

The present invention is directed to an image reading apparatus and image reading method.

It is an object of the present invention to provide an image reading apparatus and image reading method which solves the problem of color misalignment upon reading a color image, while the conventional conveying mechanism can be directly used and no wasteful standby time is required.

According to one aspect of the present invention, preferably, there is provided an image reading apparatus including a plurality of light sources which irradiate an original document with light beams, and a reading sensor which reads the light beams reflected by the original document, comprising:

scanning means for scanning the plurality of light sources and the reading sensor relative to the original document;

scanning control means for scanning the scanning means in a predetermined region of the original document a plurality of number of times; and switching means for switching between the plurality of light sources for each pixel in a direction of the scanning when the scanning is to be performed, and changing a switching order of the plurality of light sources for each scanning.

According to another aspect of the present invention, preferably, there is provided a method of controlling an image reading apparatus including a plurality of light sources which irradiate an original document with light beams, and a reading sensor which reads the light beams reflected by the original document, comprising the steps of:

reading the original document by scanning the plurality of light sources and the reading sensor relative to the original document; and executing the reading step in a predetermined region of the original document, while switching between the plurality of light sources for each pixel in a direction of the scanning when the scanning is to be performed and changing a switching order of the plurality of light sources for each scanning.

According to still another aspect of the present invention, preferably, there is provided an image reading apparatus which includes three light sources which respectively irradiate an original document with light beams of three primary colors, a reading sensor which reads the light beams which are emitted by the three light sources and reflected by the original document, original document conveying means for conveying the original document, scanning means which mounts the reading sensor and scans the reading sensor in a direction perpendicular to a direction of the conveyance by the original document conveying means, and light source switching means for switching between the three light sources to select a light source to emit light, and which irradiates the original document with the light beams from the three light sources color by color, comprising:

reading control means for reading an image by scanning the scanning means which mounts the reading sensor;

conveyance control means for controlling the original document conveying means to convey the original document by ⅓ of a reading width of the reading sensor in the direction of the conveyance every time the image is read by the reading control means; and light source switching control means for controlling the light source switching means to read each pixel of the image with the light beams from the three light sources.

According to still another aspect of the present invention, preferably, there is provided an image reading method using an image reading apparatus which includes three light sources which respectively irradiate an original document with light beams of three primary colors, a reading sensor which reads the light beams which are emitted by the three light sources and reflected by the original document, original document conveying means for conveying the original document, scanning means which mounts the reading sensor and scans the reading sensor in a direction perpendicular to a direction of the conveyance by the original document conveying means, and light source switching means for switching between the three light sources to select a light source to emit light, and which irradiates the original document with the light beams from the three light sources color by color, comprising the steps of:

reading an image by scanning the scanning means which mounts the reading sensor;

conveying the original document by ⅓ of a reading width of the reading sensor in the direction of the conveyance every time the image is read in the reading step; and controlling the light source switching means to read each pixel of the image with the light beams from the three light sources in the reading step.

The present invention is particularly advantageous since reading can be performed using R, G, and B light sources at the same position for each pixel so that no color misalignment occurs even when the moving-document reading scheme is adopted. It is also possible to simplify the arrangement of a mechanism which conveys an original document (or reading sensor) because the moving-document reading scheme can be adopted. It is also possible to reduce the cost of an image reading apparatus because a reading sensor can be downsized.

Further features of the present invention will become apparent from the following description of exemplary embodiments with reference to the attached drawings.

BRIEF DESCRIPTION OF THE DRAWINGS

FIG. 10 is a view showing the light source switching timing according to the prior art.

DESCRIPTION OF THE EMBODIMENTS

Embodiments of the present invention will be described in detail below with reference to the accompanying drawings.

First Embodiment

Figure 1:
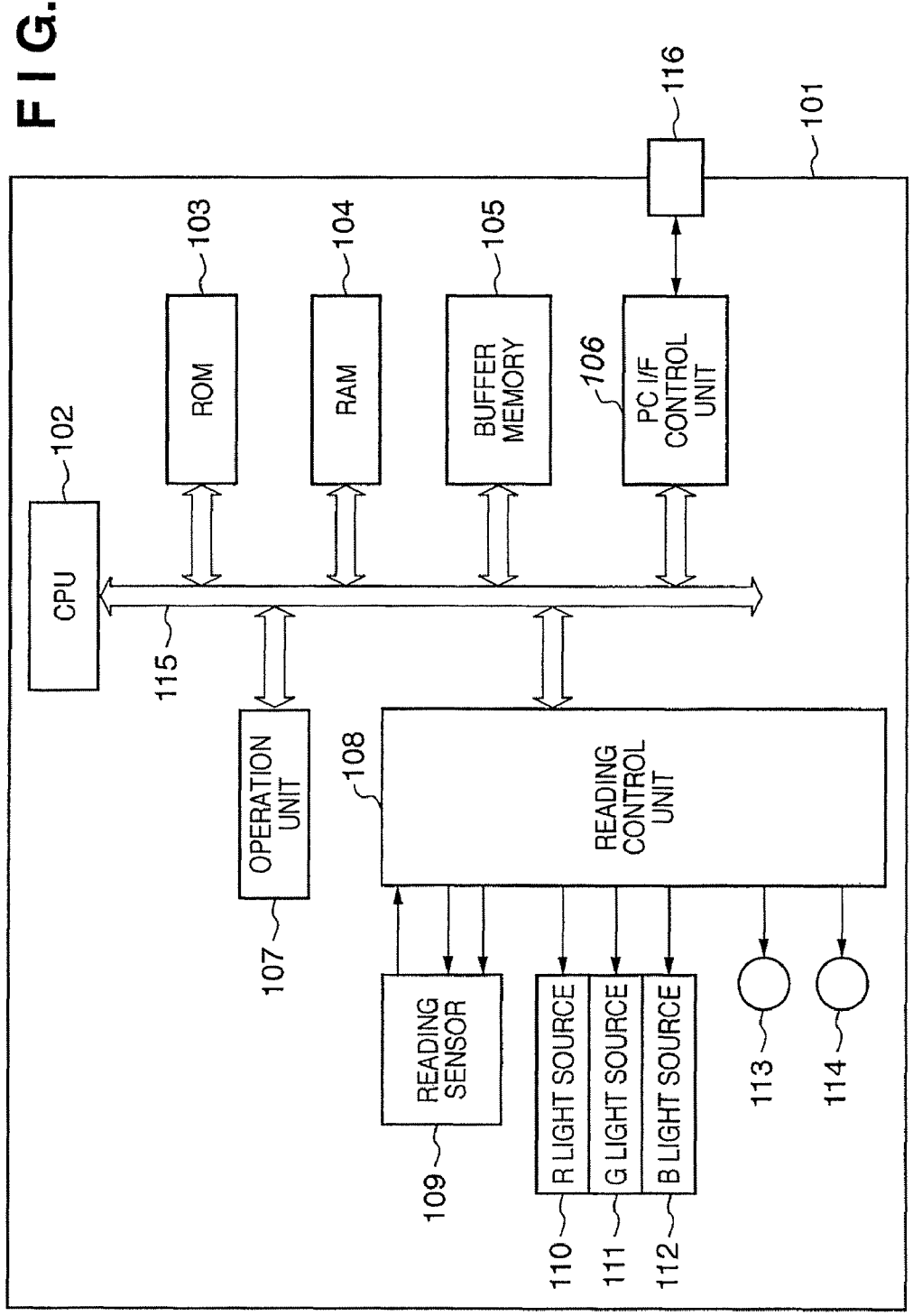
FIG. 1 is a block diagram showing the electrical arrangement of an image reading apparatus according to an embodiment of the present invention.

An embodiment of an image reading apparatus to which the present invention is applied will be explained below. FIG. 1 is a block diagram showing the electrical arrangement of an image reading apparatus according to an embodiment of the present invention.

Reference numeral 101 denotes an image reading apparatus main body. A CPU 102 controls the image reading apparatus. A nonvolatile memory (ROM) 103 stores, for example, a control program for controlling the overall image reading apparatus 101. The CPU 102 controls the overall image reading apparatus 101 in accordance with the control program stored in the ROM 103. A memory (to be referred to as a RAM hereinafter) 104 is used for, for example, an arithmetic process for controlling various operations. A buffer memory 105 buffers image data read by a reading control unit. A PC I/F control unit 106 controls communication with an information processing device such as a personal computer (PC). An operation unit 107 has various operation buttons for allowing the operator to operate the image reading apparatus, and display units represented by an LED and LCD. A reading control unit 108 executes various driving control processes for reading an original document by a reading sensor 109 (to be described later), and a signal process of the image data read by the reading sensor 109. The reading sensor 109 comprises photoelectric transducers aligned in a line. For example, an arrayed direction of the photoelectric transducers corresponds to a conveyance direction of an original document. The reading sensor 109 moves in a different direction from the arrayed direction when the reading sensor 109 reads an original document. Three light sources, that is, R, G, and B light sources 110 to 112 irradiate an original document with light beams of three primary colors R (Red), G (Green), and B (Blue), respectively, to read a color image. The reading sensor 109 receives (reads) the light beams which are emitted by the three light sources 110 to 112 and reflected by the original document. An original document conveying motor 113 drives a conveying mechanism which conveys an original document. A carriage conveying motor 114 conveys a carriage which mounts the reading sensor 109. A system bus 115 connects each block to the CPU 102. An interface connector 116 connects the image reading apparatus 101 to an external information processing device such as a PC.

Figure 2:
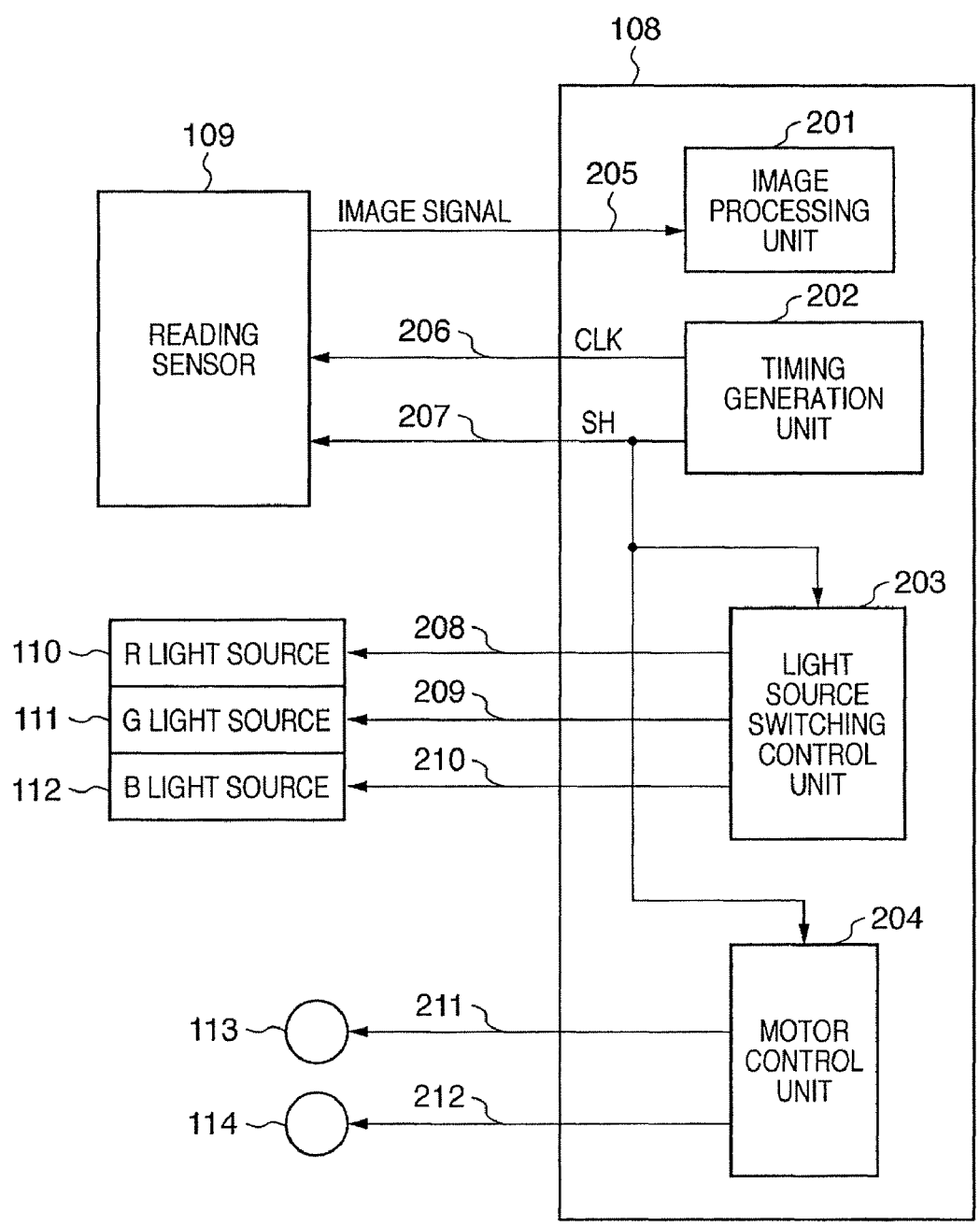
FIG. 2 is a block diagram showing details of the arrangement of a reading control unit.

FIG. 2 is a block diagram showing further details of the arrangement of the reading control unit 108.

An image processing unit 201 converts an analog image signal received from the reading sensor 109 into a digital signal, executes shading correction for the digital signal, and outputs the corrected signal. A timing generation unit 202 generates and outputs a line sync signal (SH signal) 207 determined by the accumulation time of the reading sensor 109, and a transfer clock signal (CLK signal) 206 for transferring an image signal from the reading sensor. A switching control unit (switching unit) 203 controls the switching between the light sources while synchronizing with the line sync signal 207, and outputs ON/OFF control signals 208 to 210 for the R, G, and B light sources, respectively. A motor control unit 204 outputs signals 211 and 212 for driving the original document conveying motor and carriage conveying motor, while synchronizing with the line sync signal 207 to control the conveyance of the original document and carriage.

Figure 4:
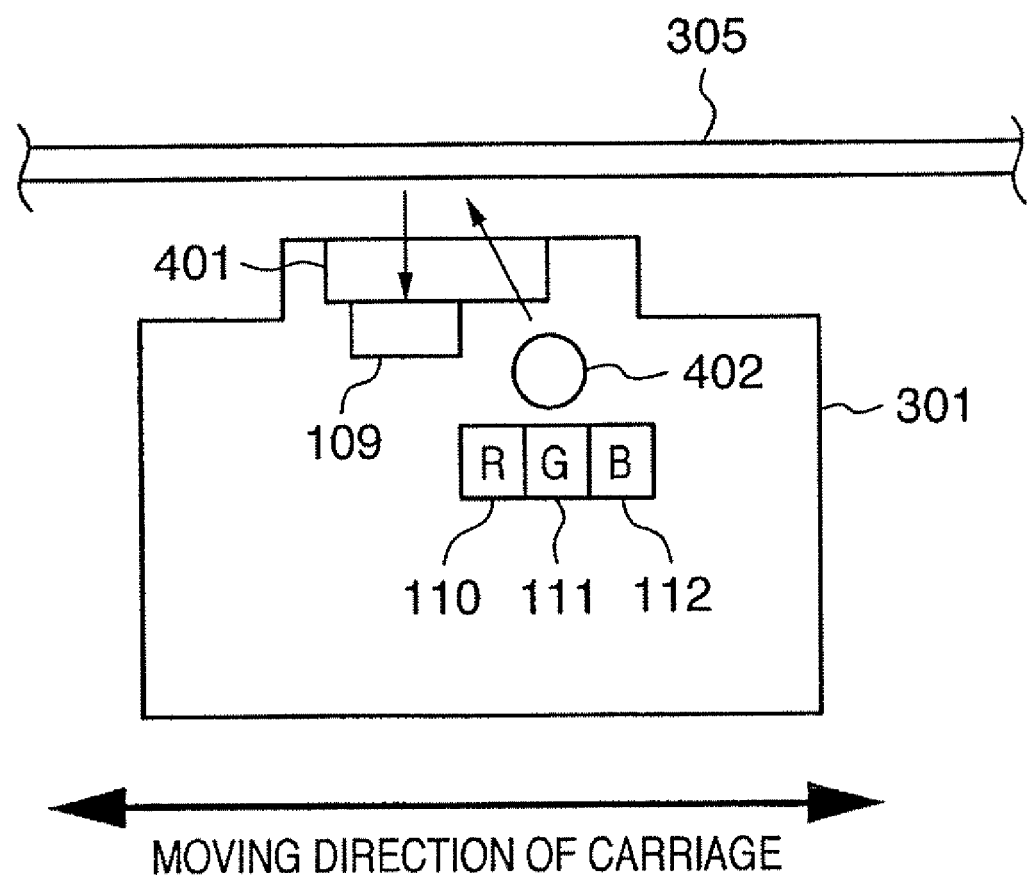
FIG. 4 is a view showing the structure of a carriage which incorporates a reading sensor.

FIG. 4 is a view showing the structure of a carriage 301 which incorporates the reading sensor 109. A transparent glass 401 protects the reading sensor 109. A light guide 402 guides light beams of respective colors emitted by the light sources 110 to 112 to irradiate an original document. Reference numeral 305 denotes an original document.

The outline of a concrete operation will be explained with reference to FIG. 3.

Figure 3:
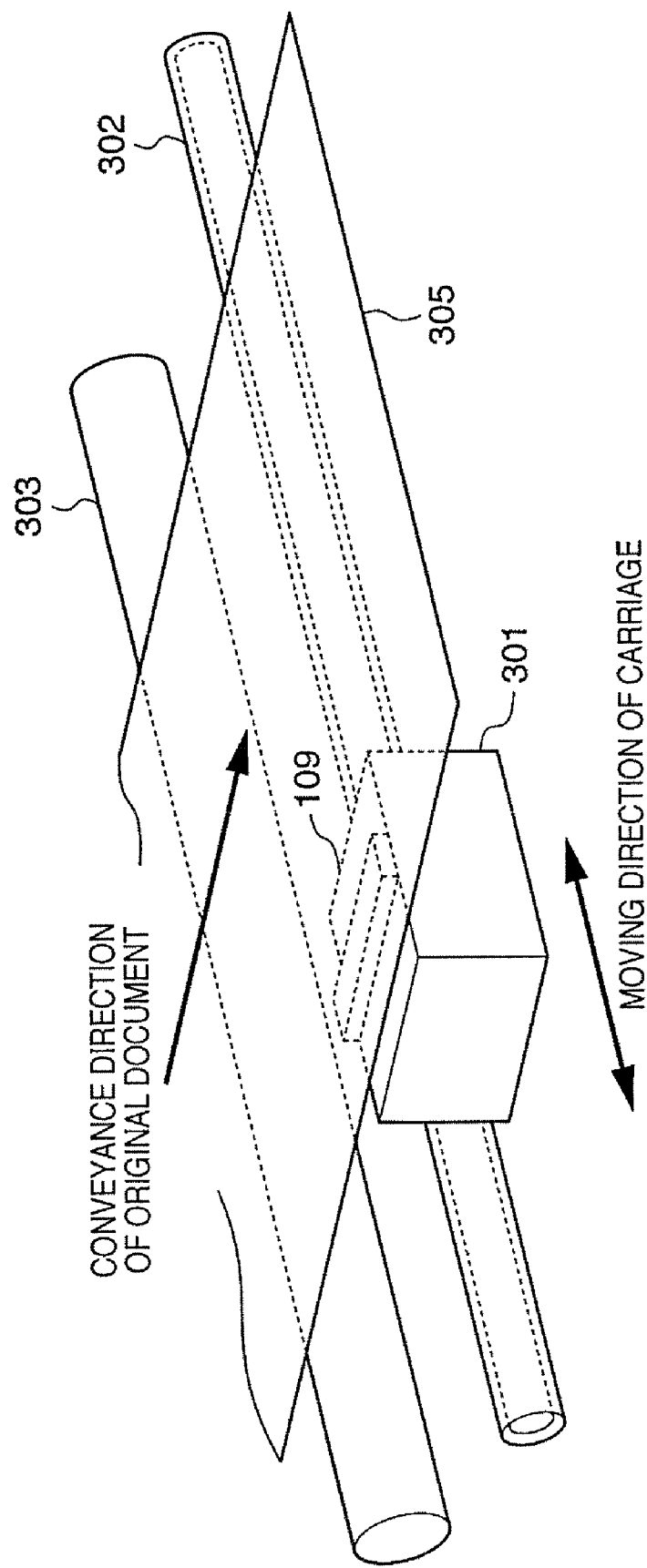
FIG. 3 is a view showing the mechanism of the image reading apparatus according to the embodiment of the present invention.

Referring to FIG. 3, the carriage 301 incorporates the reading sensor 109. A belt 302 scans the carriage 301 in the "Moving Direction of Carriage" in FIG. 3, and is driven by the carriage conveying motor 114. An original document conveying roller 303 moves the original document 305 in the "Conveyance Direction of Original Document" in FIG. 3, and is driven by the original document conveying motor 113. With this arrangement, the reading sensor 109 reads the original document by its valid reading width (the width of one band) while moving the carriage in a scanning direction perpendicular to the conveyance direction of the original document. After the reading by one band is completed, the original document is moved by ⅓ of the width of one band while returning the carriage to the original position. Then, one band is read while moving the carriage again. By repeating this operation, the original document is read.

The reading start portion (leading edge) of the original document is conveyed to a position corresponding to the first one-third of the valid reading width in the conveyance direction of the original document, and the first band is read. However, the last two-thirds of the reading data in the conveyance direction of the original document are discarded as invalid data. The original document is further conveyed by ⅓ of one band, and the second band is read. The last one-third of the reading data in the conveyance direction of the original document is discarded as invalid data. The original document is further conveyed by ⅓ of one band, and the third band is read. At this time and subsequent times, all data are valid except for the trailing edge of the original document. Of the trailing edge of the original document, a portion which is read but falls outside the original document is similarly discarded as invalid data. In this manner, the original document is read by the width of one band while being moved in steps of ⅓ of the width of one band. By repeating this operation, the same pixel is read three times. This state will be explained with reference to FIG. 5.

Figure 5:
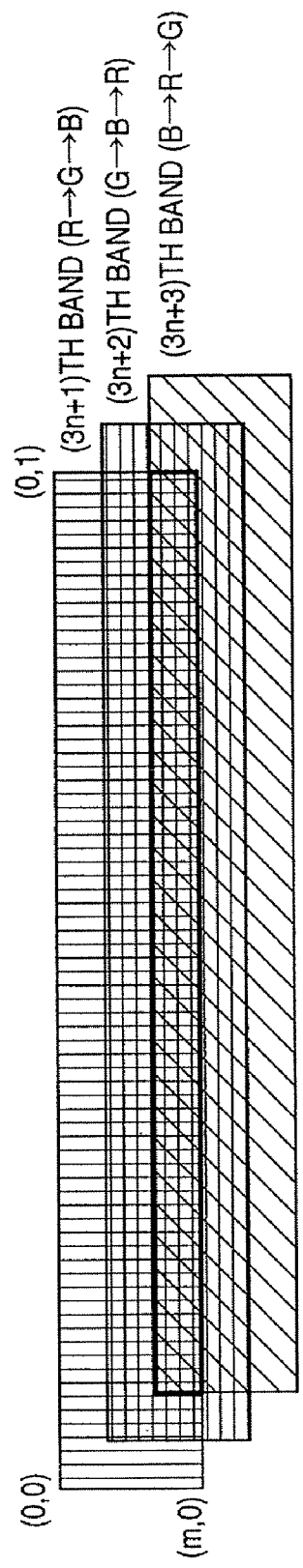
FIG. 5 is a view showing the reading range of each band.

Three bands shown in FIG. 5 indicate areas read by their respective reading operations. The vertical dimension of each band indicates the valid reading width of a reading sensor, that is, the width of one band. The horizontal dimension of each band indicates the width of an original document. Referring to FIG. 5, (m+1) pixels are present in the valid reading width (the width of one band), and (l+1) pixels are present in the width of the original document. When the original document is conveyed to be read, it is moved by ⅓ of the (m+1) pixels. Note that in FIG. 5, bands are slightly shifted to the right sequentially from the top band for easy understanding. However, the positions of the respective bands match each other on the left and right sides in practice. As is obvious from FIG. 5, after the third band is read at the leading edge of the original document, a band read three times by ⅓ of the width of one band for each reading operation is obtained. A portion surrounded by a bold frame corresponds to the obtained band in FIG. 5.

Figure 6:
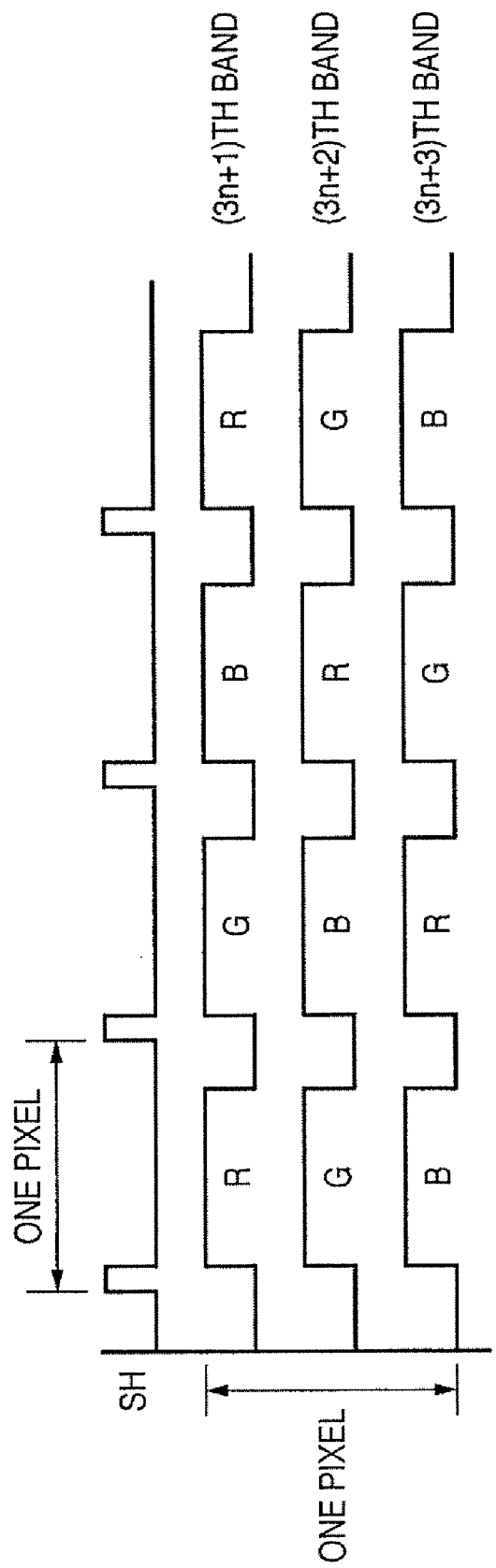
FIG. 6 is a timing chart showing the light source switching timing according to the first embodiment.
Figure 7:
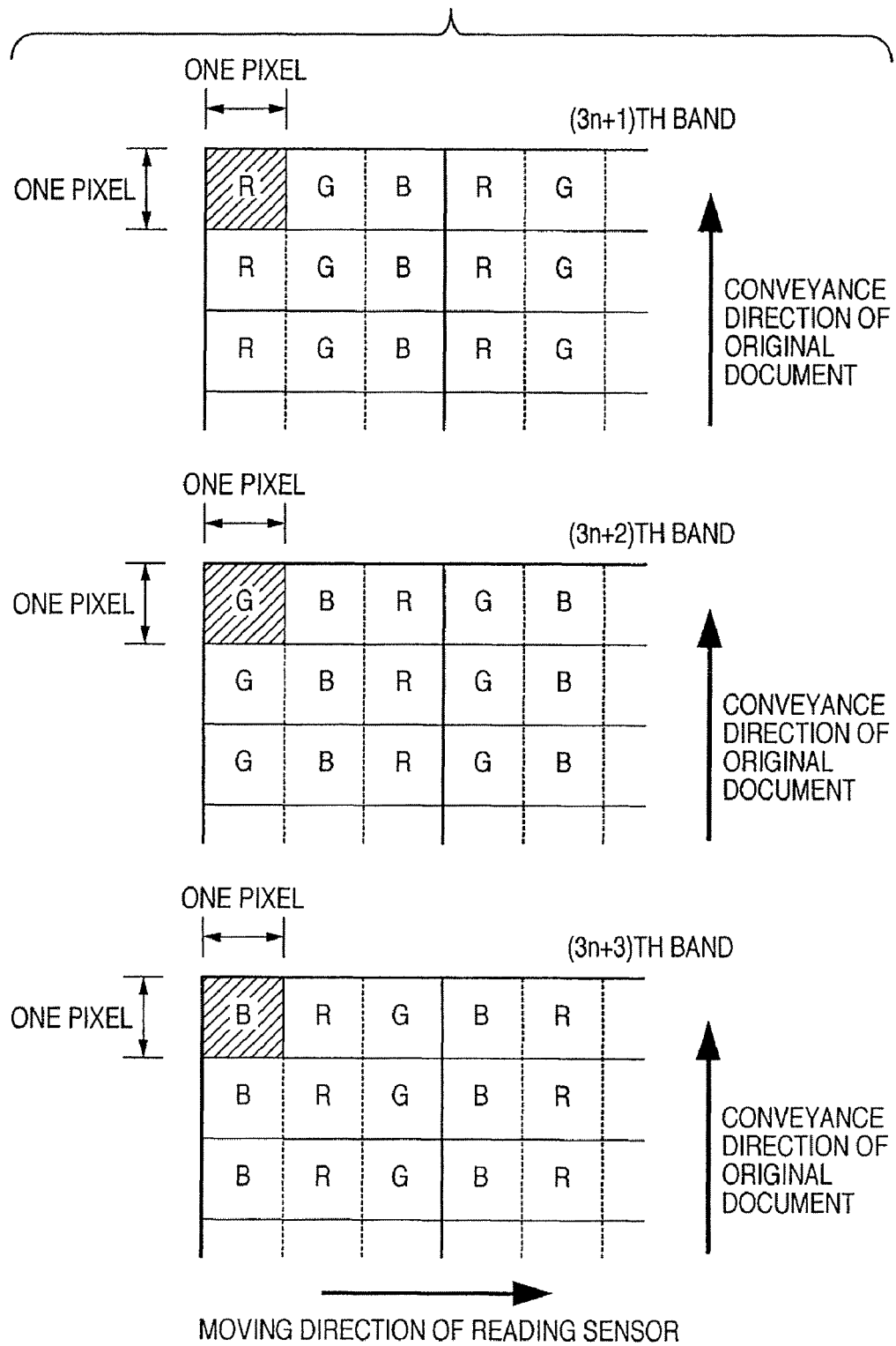
FIG. 7 is a view showing which color light source irradiates each pixel according to the first embodiment.

Switching control between light sources of R, G, and B colors in the reading operation of one band will be explained next. FIG. 6 is a timing chart showing the light source ON/OFF switching timing. The light sources are switched to select a light source to emit light read by the reading sensor 109 for each raster while synchronizing with a line sync signal (SH signal). When the (3n+1)th band (n=0, 1, 2, 3, . . . ) is to be read, the light sources are turned on in the order of R→G→B for each raster. In other words, the light sources are switched for each pixel in a moving direction (scanning direction) of the reading sensor 109. When the (3n+2)th band (n=0, 1, 2, 3, . . . ) is to be read, the light sources are turned on in the order of G→B→R for each raster. When the (3n+3)th band (n=0, 1, 2, 3, . . . ) is to be read, the light sources are turned on in the order of B→R→G for each raster. As a consequence, each pixel is read using the R, G, and B light sources. FIG. 7 shows which color light source irradiates each pixel in reading each band.

Obviously, pixels which correspond to a portion surrounded by a bold frame in FIG. 5 and in each of which the (3n+1)th band, (3n+2)th band, and (3n+3)th band are read are each read by three reading operations using the R, G, and B light sources. An example of a pixel indicated by halftone portions in FIG. 7 reveals that the (3n+1)th band, (3n+2)th band, and (3n+3)th band are irradiated with light beams from the R, G, and B light sources, respectively. It is therefore possible to obtain data read using the R, G, and B light sources at the same position for one pixel.

Figure 11:
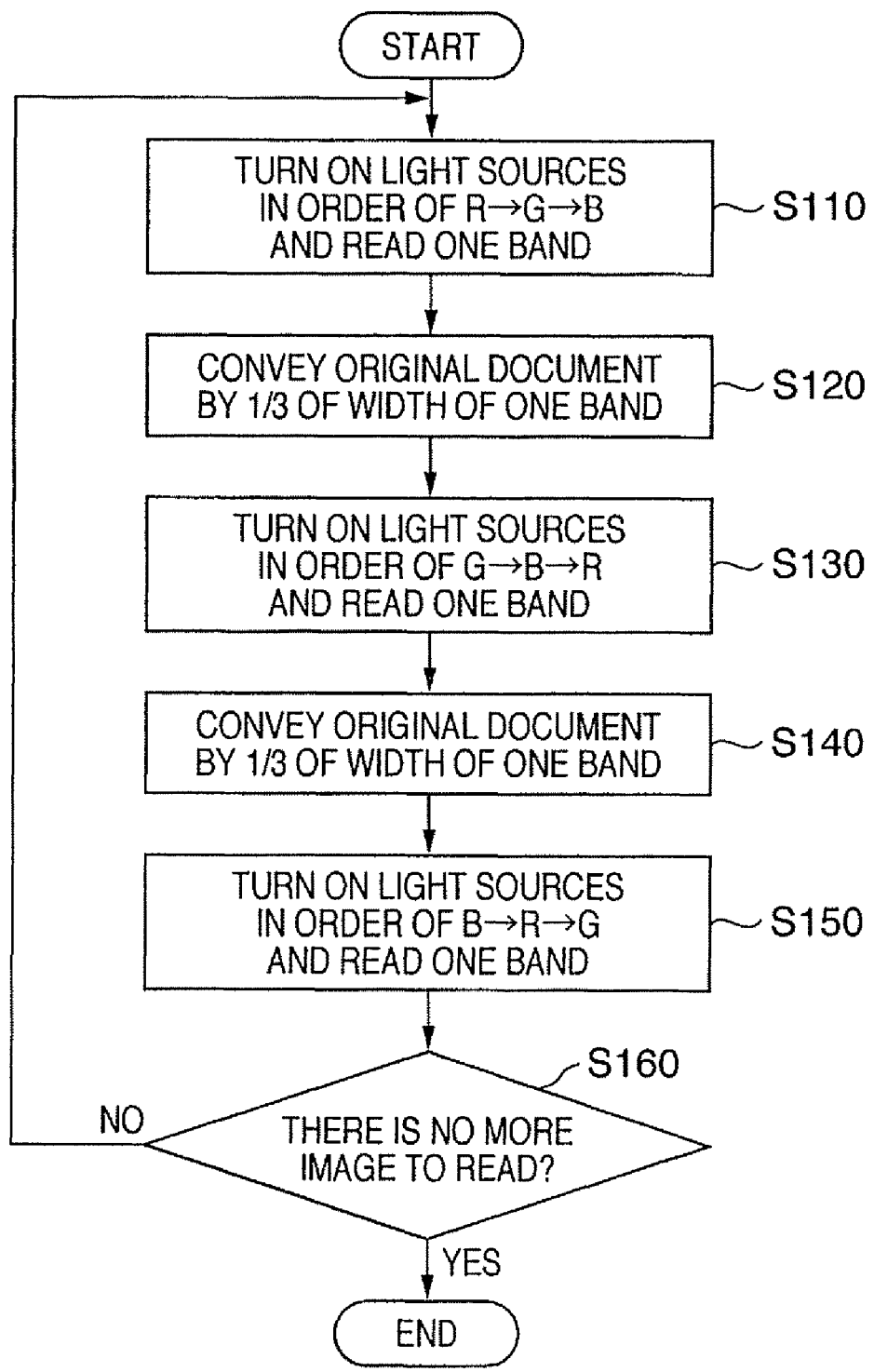
FIG. 11 is a flowchart illustrating an image reading method according to the first embodiment.

FIG. 11 is a flowchart illustrating an image reading method according to this embodiment.

When a reading operation starts, in step S110 an original document is conveyed to a reading position and one band is read. The light sources emit light beams in the order of R→G→B for each raster. In step S120, the original document is conveyed by ⅓ of the width of one band. In step S130, the light sources emit light beams in the order of G→B→R for each raster and one band is read. In step S140, the original document is conveyed by ⅓ of the width of one band. In step S150, the light sources emit light beams in the order of B→R→G for each raster and one band is read. It is determined in step S160 whether there is no more of an image to read. If YES in step S160, the process ends. If NO in step S160, the process returns to step S110.

In this embodiment, the three light sources are sequentially switched in the scanning direction of the carriage for each pixel to select a light source to emit light. At the same time, the order in which the three light sources emit light beams is switched for each carriage scanning. With the above-described arrangement, reading can be performed using the R, G, and B light sources at the same position for one pixel even when the moving-document reading scheme is adopted. This makes it possible to solve the conventional problem of color misalignment. It is also possible to simplify the arrangement of a mechanism which conveys an original document (or reading sensor) because the moving-document reading scheme can be adopted. It is also possible to reduce the cost of an image reading apparatus because a reading sensor can be downsized.

According to this embodiment, the R, G, and B light sources are switched for each reading operation of one raster. This makes it possible to directly use the conventional light source switching control method.

Second Embodiment

In the first embodiment, the (3n+1)th band, (3n+2)th band, and (3n+3)th band are read by turning on the light sources in the orders of R→G→B, G→B→R, and B→R→G, respectively, for each raster. In contrast, when an arrangement in which the same pixel is read three times using light sources of respective colors is adopted as the basic arrangement, the same result is obtained even by switching between the light sources not for each raster but for each reading operation of one band. In this embodiment, the light sources are switched for each reading operation of one band.

Figure 8:
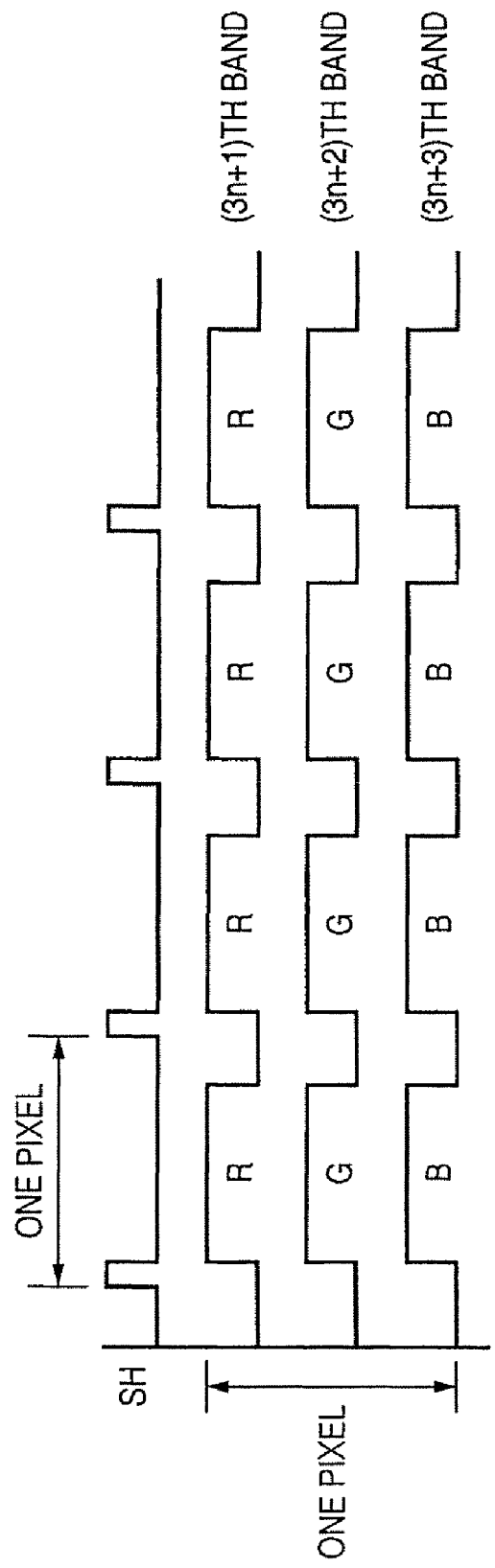
FIG. 8 is a timing chart showing the light source switching timing according to the second embodiment.
Figure 9:
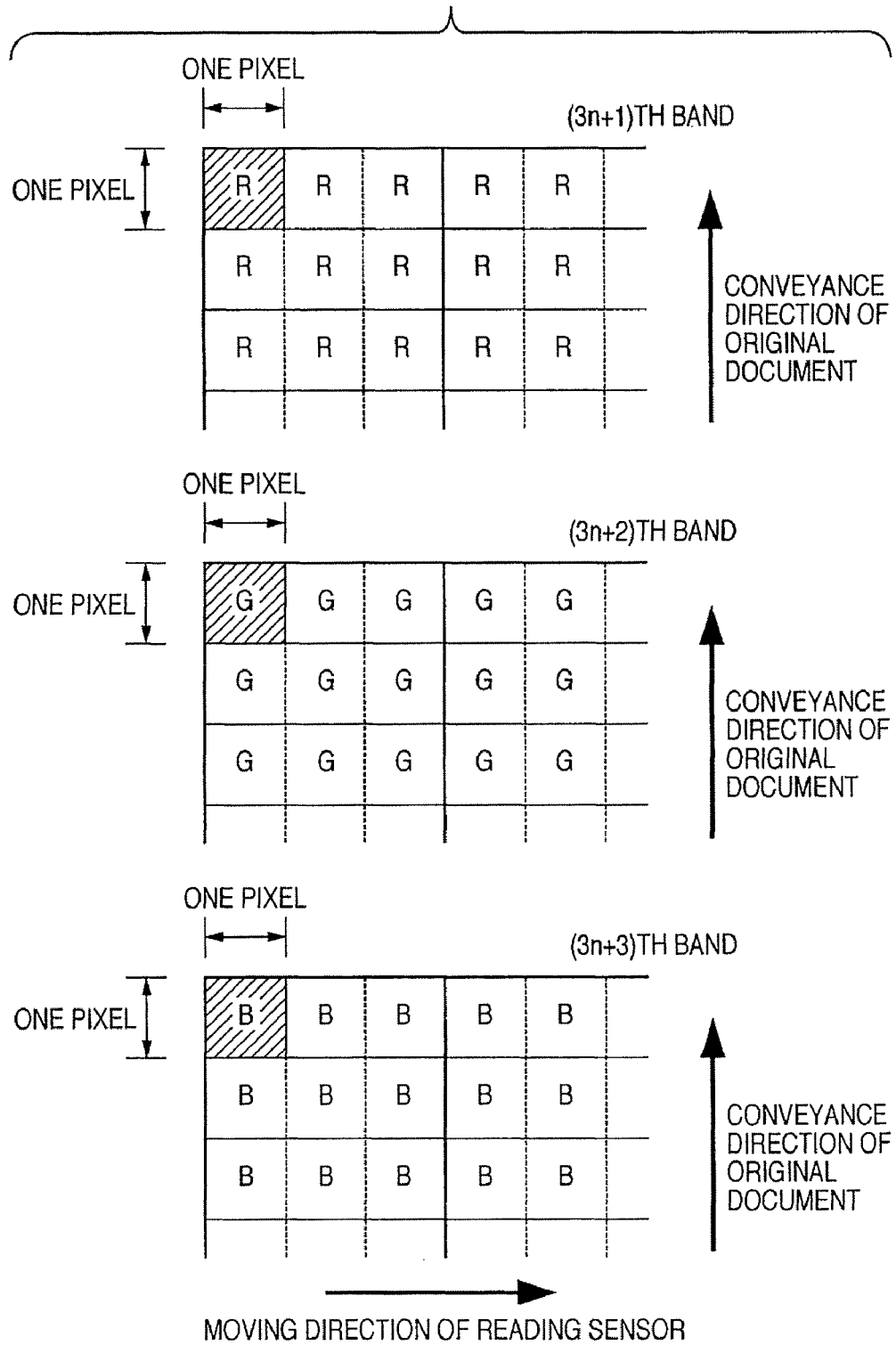
FIG. 9 is a view showing which color light source irradiates each pixel according to the second embodiment.

In other words, as shown in FIG. 8, all pixels of the (3n+1)th band (n=0, 1, 2, 3, ...) are read by irradiating them with light from only the R light source. All pixels of the (3n+2)th band (n=0, 1, 2, 3, ...) are read by irradiating them with light from only the G light source. All pixels of the (3n+3)th band (n=0, 1, 2, 3, ...) are read by irradiating them with light from only the B light source. As a consequence, each pixel is read using the R, G, and B light sources. FIG. 9 shows which color light source irradiates each pixel in reading each band.

As in the first embodiment, obviously, each pixel is read by three reading operations using the R, G, and B light sources. An example of a pixel indicated by halftone portions in FIG. 9 reveals that the (3n+1)th band, (3n+2)th band, and (3n+3)th band are irradiated with light beams from the R, G, and B light sources, respectively.

In this embodiment, the three light sources are switched for each reading operation of one band. This arrangement obviates the need to switch between the light sources in each band. This makes it possible to further simplify light source switching control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-071198, filed Mar. 19, 2007, which is hereby incorporated by reference herein in its entirety.

What is claimed is:

1. An image reading apparatus including a plurality of light sources each of which corresponds to each of a plurality of colors, and a reading sensor which reads a light beam reflected by an original document, comprising:
    conveying means for conveying the original document;
    scanning means for scanning the plurality of light sources and the reading sensor, relative to the original document in a scanning direction different from a conveyance direction in which the original document is conveyed by the conveying means;
    conveyance control means for controlling the conveying means to convey the original document by an amount which is shorter than a reading width in the conveyance direction of the reading sensor after each scanning by the scanning means so that the scanning means scans, more than once, on a region of the original document, wherein the amount corresponds to a width of a predetermined number of pixels, and the region is defined by the amount in the conveyance direction and a width of the original document in the scanning direction; and
    light source control means for selecting a light source to be turned on among the plurality of light sources, based on a selecting order for each predetermined number of pixels in the scanning direction, and changing the selecting order for each scanning.

2. The apparatus according to claim 1, wherein the conveyance control means controls the conveying means to convey the original document by 1/n (n: a plural number) of the reading width of the reading sensor in the conveyance direction.

3. The apparatus according to claim 1, wherein the light source control means selects a light source to be turned on among the plurality of light sources, for each pixel in the scanning direction in the scanning.

4. The apparatus according to claim 1, wherein the light source control means selects a light source to be turned on among the plurality of light sources such that all of the plurality of light sources are selected for each scanning.

5. The apparatus according to claim 1, wherein the plurality of light sources include a red light source, a green light source, and a blue light source.

6. A method of controlling an image reading apparatus including a plurality of light sources each of which corresponds to each of a plurality of colors, and a reading sensor which reads a light beam reflected by an original document, comprising the steps of:
    conveying the original document;
    reading the original document by scanning the plurality of light sources and the reading sensor, relative to the original document in a scanning direction different from a conveyance direction in which the original document is conveyed;
    controlling the conveying step to convey the original document by an amount which is shorter than a reading width in the conveyance direction of the reading sensor after each scanning so that the scanning is performed, more than once, on a region of the original document, wherein the amount corresponds to a width of a predetermined number of pixels, and the region is defined by the amount in the conveyance direction and a width of the original document in the scanning direction; and selecting a light source to be turned on among the plurality of light sources, based on a selecting order for each predetermined number of pixels in the scanning direction in the scanning, and changing the selecting order for each scanning.

7. An image reading apparatus which includes three light sources which respectively irradiate an original document with light beams of three primary colors, a reading sensor which reads the light beams which are emitted by the three light sources and reflected by the original document, original document conveying means for conveying the original document, scanning means which mounts the reading sensor, and light source switching means for switching between the three light sources to select a light source to emit light, and which irradiates the original document with the light beams from the three light sources color by color, comprising:

reading control means for reading an image by scanning the scanning means in a scanning direction perpendicular to a conveyance direction of the conveyance by the original document conveying means;

conveyance control means for controlling the original document conveying means to convey the original document by ⅓ of a reading width in the conveyance direction of the reading sensor every time the image is read by the reading control means; and light source switching control means for controlling the light source switching means to switch between the three light sources to select a light source of the three light sources to emit light, based on a selecting order for each predetermined number of pixels in the scanning direction in the reading by the reading control means, and changing the selecting order for each reading.

8. The apparatus according to claim 7, wherein the light source switching control means sequentially switches between the three light sources in the scanning direction for each pixel to select a light source to emit light, and changes the selecting order for each reading.

9. An image reading method using an image reading apparatus which includes three light sources which respectively irradiate an original document with light beams of three primary colors, a reading sensor which reads the light beams which are emitted by the three light sources and reflected by the original document, original document conveying means for conveying the original document, scanning means which mounts the reading sensor, and light source switching means for switching between the three light sources to select a light source to emit light, and which irradiates the original document with the light beams from the three light sources color by color, comprising the steps of:

reading an image by scanning the scanning means in a scanning direction perpendicular to a conveyance direction of the conveyance by the original document conveying means;

conveying the original document by ⅓ of a reading width in the conveyance direction of the reading sensor every time the image is read in the reading step; and controlling the light source switching means to switch between the three light sources to select a light source of the three light sources to emit light, based on a selecting order for each predetermined number of pixels in the scanning direction in the reading in the reading step, and changing the selecting order for each reading.

* * * * *